United States Patent [19]

Nihei et al.

[11] Patent Number: 4,909,469
[45] Date of Patent: Mar. 20, 1990

[54] SEAT SLIDER ASSEMBLY

[75] Inventors: Masao Nihei; Seiji Yamaguchi, both of Kanagawa, Japan

[73] Assignee: Ohi Seisakusho Co., Ltd., Yokohama, Japan

[21] Appl. No.: 182,661

[22] Filed: Apr. 18, 1988

Related U.S. Application Data

[63] Continuation-in-part of Ser. No. 920,682, Oct. 20, 1986, abandoned.

[30] Foreign Application Priority Data

Oct. 18, 1985 [JP] Japan ................ 60-232847

[51] Int. Cl.⁴ ..................................... F16M 13/00
[52] U.S. Cl. ................................ 248/429; 296/65.1
[58] Field of Search ............ 296/65 R; 248/429, 430, 248/393; 297/346, 316

[56] References Cited

U.S. PATENT DOCUMENTS

| | | | |
|---|---|---|---|
| 407,902 | 7/1889 | Schade | 292/348 |
| 2,175,452 | 10/1939 | Whedon | 297/346 |
| 2,567,612 | 9/1951 | McGehee | 297/346 |
| 3,189,312 | 6/1965 | Bilancia | 297/346 |
| 4,384,701 | 5/1983 | Barley | 296/65 R |
| 4,635,890 | 1/1987 | Matsuda et al. | 248/429 |
| 4,660,795 | 4/1987 | Ikegaya et al. | 296/65 R |
| 4,726,617 | 2/1988 | Nishimura | 296/65 R |
| 4,742,983 | 5/1988 | Nihei | 248/429 |

FOREIGN PATENT DOCUMENTS

| | | | |
|---|---|---|---|
| 940208 | 2/1956 | Fed. Rep. of Germany | 248/430 |
| 3211857 | 10/1983 | Fed. Rep. of Germany | 248/429 |
| 1009834 | 4/1983 | U.S.S.R. | 248/429 |

Primary Examiner—Margaret A. Focarino
Assistant Examiner—Joseph D. Pape
Attorney, Agent, or Firm—Cushman, Darby & Cushman

[57] ABSTRACT

A seat slider assembly for supporting a seat on a vehicle so as to be adjustable in its position in a forward or rearward direction of the seat, which includes a rail member to be fixed to a vehicle body and provided with an engaging portion, a rail member to be fixed to the seat, the latter rail member being mounted on the former rail member movably in the longitudinal direction of the rail member, a bracket fixed to said rail member to be fixed to the seat and provided with two curled bearing portions, an operating lever whose shaft portion is pivotably supported by the two curled portions of the bracket and a latch member fixed to the shaft portion of the operating lever and selectively engageable with the engaging portion, the latch member being fitted between the two curled bearing portions; which assembly comprises a ring acting on the shaft portion of the operating lever for holding the latch member in a position where the latch member is pressed against either one of inner end faces of the curled bearing portions of the bracket. With this arrangement, the moving of the latch member in the longitudinal direction is suppressed and shaking and rattling of the latch member is minimized.

4 Claims, 4 Drawing Sheets

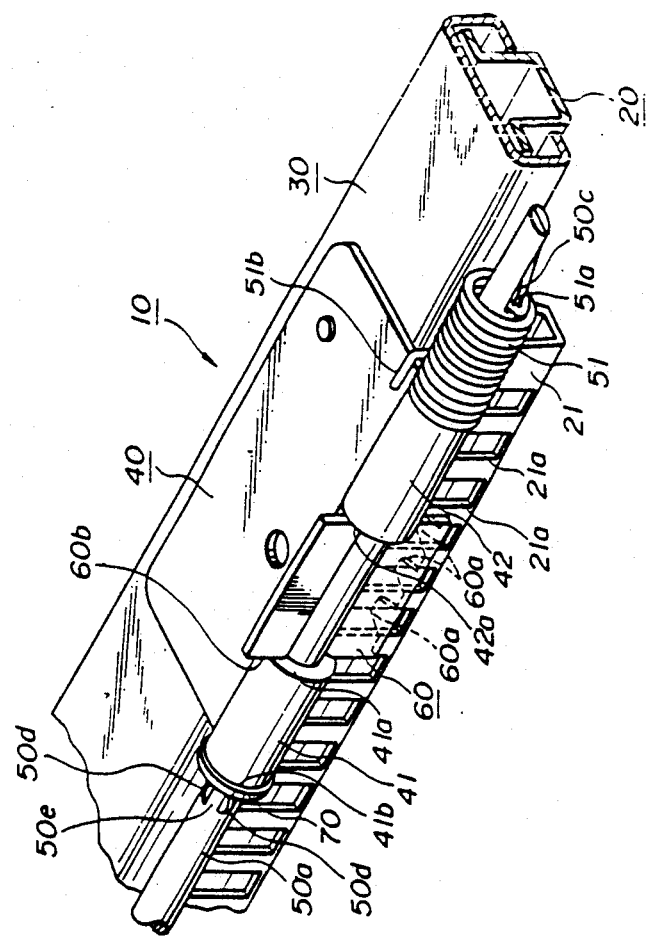

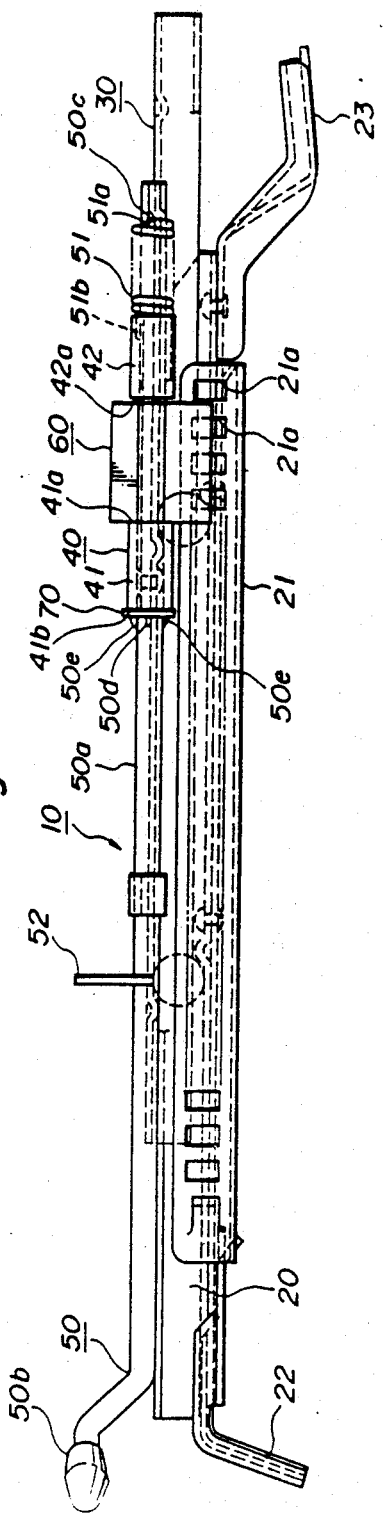
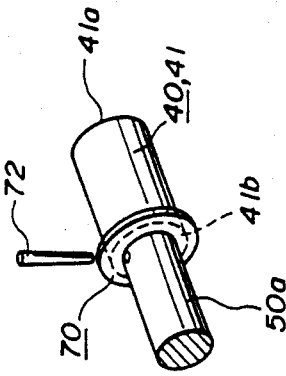

SEAT SLIDER ASSEMBLY

This is a continuation in part of application Ser. No. 920,682 filed Oct. 20, 1986 now abandoned.

BACKGROUND OF THE INVENTION

1. Field of the Invention

This invention relates to a seat slider assembly for supporting a seat so as to be adjustable in its position in a forward or rearward direction of the seat.

2. Prior Art

Conventional seat slider assemblies heretofore known include a seat slider assembly as illustrated in FIGS. 7 and 8. In this seat slider assembly, a rail member c to be fixed to the seat (which is hereinafter referred to as a seat-rail member) is coupled with a rail member b to be fixed to a vehicle body (which is hereinafter referred to as a vehicle body-rail member) so as to be slidable in the longitudinal direction of the rail members. The vehicle body-rail member b is provided with an engaging portion a. A bracket d fixed to the seat-rail member c has two curled portions e, e for pivotably bearing a shaft portion g of an operating lever f. A latch member h adapted to be selectively engaged with engaging holes of the engaging portion a is fixed to the shaft portion g of the operating lever f. The latch member h is fitted between the two curled bearing portions e, e. The operating lever f is operated to rotate the latch member h so that the latch member h is brought into engagement with the engaging portion a at a selected position for adjusting the position of the seat in the forward and rearward directions thereof.

The seat slider assembly of this type, however, requires adequate gaps 1, 1 between opposite end faces of the latch member h and inner end faces of the two curled bearing portions e, e, respectively, for allowing the latch member h to rotate smoothly. If the latch member h is tightly fitted between the inner end faces of the curled bearing portions e, e, a larger force is needed to operate the operating lever f for rotating the latch member h. If the gaps 1, 1 are too large, the latch member h is loose in the longitudinal direction. This will make shaking and rattling at a time of starting or stopping of the vehicle. To prevent the shaking and rattling, strict dimensional control is needed for the gaps 1, 1, which will increase a manufacturing cost.

This invention has been made with a view to obviating the problems involved in the prior art, and it is an object of the present invention to provide a seat slider assembly which is capable of preventing the shaking and rattling without strict dimensional control for the gaps between the opposite end faces of the latch member and the respectively confronting inner end faces of the curled bearing portions formed on the bracket.

SUMMARY OF THE INVENTION

The present invention features a seat slider assembly for supporting a seat on a vehicle so as to be adjustable in its position in a forward or rearward direction of the seat, which includes a rail member to be fixed to a vehicle body and provided with an engaging portion, a rail member to be fixed to the seat, the latter rail member being mounted on the former rail member movably in the longitudinal direction of the rail member, a bracket fixed to said rail member to be fixed to the seat and provided with two curled bearing portions, an operating lever whose shaft portion extending substantially along the lengths of the rail members is pivotably supported by the two curled bearing portions of the bracket and a latch member fixed to said shaft portion of the operating lever and selectively engageable with said engaging portion, said latch member being fitted between the two curled bearing portions; which assembly comprises means acting on said shaft portion of the operating lever for holding said latch member in a position where the latch member is pressed against either one of inner end faces of the curled bearing portions of the bracket.

The means acting on the shaft portion of the operating lever includes an abutment member mounted on the shaft portion of the operating lever to press against one of the outer end faces of the curled bearing portions and means for fixing said abutment member relative to the length of the shaft portion of the operating lever in the position where the latch member is pressed in the longitudinal direction of the rail members against either one of inner end faces of the curled bearing portions of the bracket.

The means for fixing the abutment member to the shaft portion of the operating lever has a contour which progressively and automatically biases the shaft portion of the operating lever relative to the abutment member when the last-mentioned means is being set into the assembly.

Instead of using the outer end face of the curled bearing portion, the abutment member may alternatively be engaged with or pressed against any suitable member fixed to the seat rail member to restrain the latch member in the biased position pressed against the inner end face of the curled bearing portion as described above.

In the seat slider assembly of the present invention, the latch member is first fitted between the inner end faces of the respective curled bearing portions of the bracket and fixed to the shaft portion of the operating lever. Thereafter, one end of the latch member is pressed against the confronting inner end face of the corresponding curled bearing portion and the latch member is held in the position, for example, by engaging an abutment member provided on the shaft portion of the operating lever with an outer end of the curled bearing portion or said suitable member provided on the seat rail member and locking the abutment member in the position.

As a result of this, the shaft portion of the operating lever is fixed in the axial direction thereof and accordingly the latch member is fixed in the direction, too. Thus, shaking and rattling of the latch member in the longitudinal direction due to the spaces between the latch member and the bracket are eliminated.

BRIEF DESCRIPTION OF THE DRAWINGS

FIGS. 1 to 5 illustrate a first embodiment of the present invention: FIG. 1 is a perspective view of a principal portion of a seat slider assembly according to the embodiment; FIG. 2 is a perspective view of a seat supported by the seat slider assembly of the embodiment; FIG. 3 is a plan view of the entirety of the seat slider assembly; FIG. 4 is a sectional view taken along a line IV—IV of FIG. 3; FIG. 5 is a side elevation as viewed in a direction of arrow V in FIG. 3;

FIG. 6 is a perspective view of another form of means for fixing a latch member in a longitudinal direction according to the present invention;

DESCRIPTION OF PREFERRED EMBODIMENT

Figure 3:
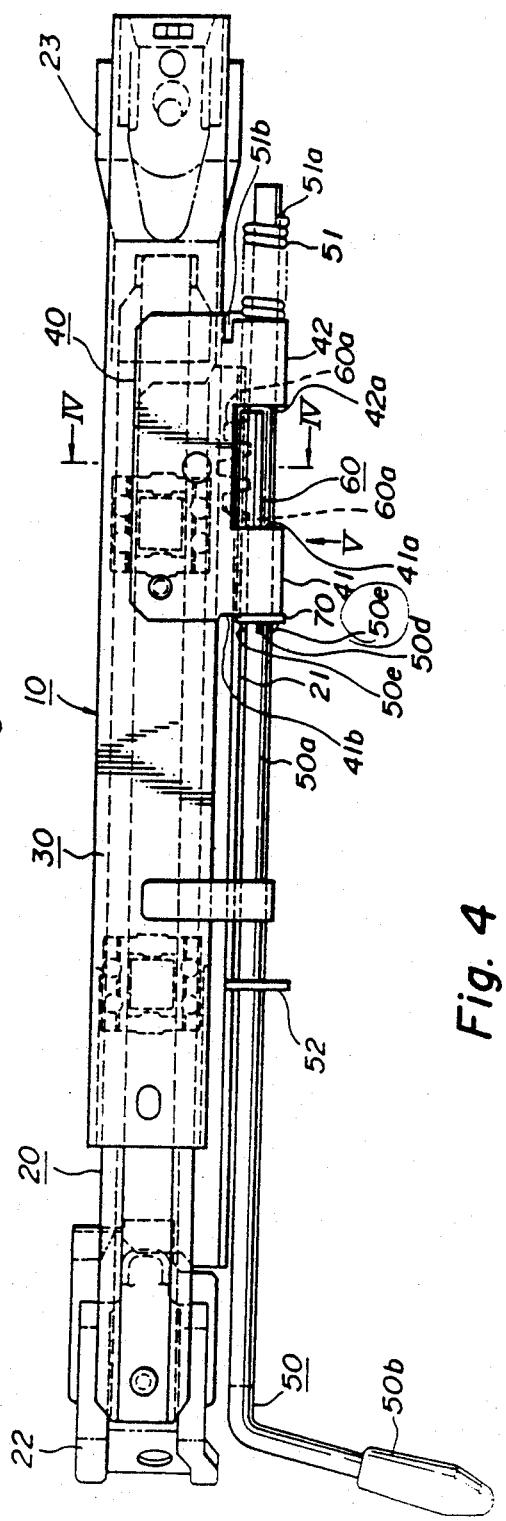

Preferred embodiments of the present invention will now be described referring to the drawings.

FIGS. 1 to 5 illustrate one preferred embodiment of the present invention.

As illustrated in FIG. 2, a seat slider assembly of the present embodiment comprises a pair of slide rails 10, 10a for supporting a seat S on a vehicle so as to be adjustable in its position in a forward or rearward direction of the seat S. An adjusting mechanism is mounted on the slide rail 10.

As can be seen from FIG. 1 and FIGS. 3 to 5, the slide rail 10 comprises a rail member 30 to be fixed to the seat S (which is hereinafter referred to as a seat-rail member) which extends along the length of the vehicle in this embodiment and a rail member 20 to be fixed to a vehicle body (which is hereinafter referred to as a vehicle body-rail member) which also extends along the length of the vehicle in this embodiment. The seat-rail member 30 is mounted on the vehicle body-rail member 20 so as to be movable in the longitudinal direction of the rail members 20 and 30 and accordingly in the longitudinal direction of the vehicle through balls 11, 11 and a roller 12.

A front bracket 22 is fixed to a front end portion of the vehicle body-rail member 20 and a rear bracket 23 is fixed to a rear end portion of the rail member 20. The front bracket 22 and the rear bracket 23 are fixed to a floor of the vehicle. An engaging bracket 21 having an engaging portion with engaging holes 21a, 21a . . . formed along the length of the bracket 21 is fixed to the vehicle body-rail member 20.

A bracket 40 is fixed to the seat-rail member 30. The bracket 40 has, at a free end thereof, two curled bearing portions 41, 42. The curled bearing portions 41, 42 rotatably support a shaft portion 50a of an operating lever 50. The operating lever 50 has, at a forward end of the shaft portion 50a, a handle 50b. A bracket 52 is fixed, for example, by welding, to the shaft portion 50a of the operating lever 50 for transmitting the rotation of the shaft portion 50a to another adjusting mechanism provided on the slide rail 10a.

A latch member 60 selectively engageable with the engaging holes 21a, 21a . . . is fixed, for example, by welding, to the shaft portion 50a of the operating lever 50. The latch member 60 is fitted between inner end faces 41a, 42a of the respective curled bearing portions 41, 42 of the bracket 40. The latch member 60 has, at its free end, three projections 60a selectively engageable with three of the engaging holes 21a, 21a . . . , respectively.

A biasing spring 51 is provided between the shaft portion 50a of the operating lever 50 and the bracket 40. One end 51a of the biasing spring 51 rests in a slit 50c formed at an end portion of the shaft portion 50a and another end 51b rests against an end of the bracket 40. With this arrangement, the shaft portion 50a of the operating lever 50 is biased in a direction for urging the projections 60a of the latch member 60 into the engaging holes 21a, 21a . . .

A ring 70 is fitted around the shaft portion 50a of the operating lever 50 for abutting against an outer end face 41b of one of the curled bearing portions 41, 42.

The ring 70 is held to be pressed against the outer end face 44b by portions 50d which are raised by nipping portions 50e, 50e on the shaft portion 50a of the operating lever 50. The raised portions 50d are formed after the latch member 60 has been biased against one inner end face 41a of the curled portion 41 and ring 70 has been placed against the outer end face 41b of the curled bearing portion 41. In the course of the formation of the raised portions 50d by nipping, the portions 50d are so formed that they progressively and automatically bias the shaft portion 50a of the operating lever 50 relative to the ring 70.

The operation of the embodiment will now be described.

The procedures for mounting the slide rail 10 of the seat slider assembly as constructed above will first be described.

The front bracket 22 and the rear bracket 23 which are fixed at the front and rear portions of the vehicle body-rail member 20, respectively, are fixed on the floor of the vehicle. The seat-rail member 30 is mounted on the vehicle body-rail member 20 through the balls 11, 11 and the roller 12 so as to be movable in the longitudinal direction of the rail member.

The shaft portion 50a of the operating lever 50 is inserted through the curled bearing portions 41, 42 of the bracket 40 which is fixed to the seat-rail member 30.

The latch member 60 is disposed between the curled bearing portions 41, 42 of the bracket 40. One end portion of the latch member 60 is fixed, for example, by welding, to the shaft portion 50a of the operating lever 50.

After fixing of the latch member 60 to the shaft portion 50a of the operating lever 50, the operating lever 50 is displaced, for example, pulled to bring and press an end 60b of the latch member 60 to and against the inner end face 41a of the curled bearing portion 41.

In this state, the ring 70 preliminarily mounted on the shaft portion 50a is put into abutment against the outer end face 41b of the curled bearing portion 41 and the shaft portion 50a is nipped by tools as shown in FIG. 1, FIG. 3 and FIG. 5 to lock the ring 70 in the position.

As the portions 50d are being formed, the ring 70 is progressively and automatically pressed against the outer end face 41b of the curled bearing portion 41 by the raised portions 50d, 50d and kept in the position, while being pressed by the portions 50d. Thus, the operating lever 50 and the latch member 60 are held fixed in the longitudinal direction of the rail members. As a result of this, shaking and rattling of the latch member 60 in the longitudinal direction can be suppressed.

Figure 4:
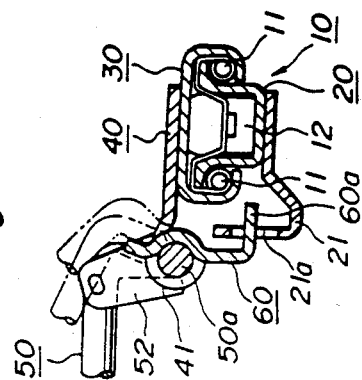
Figure 7:
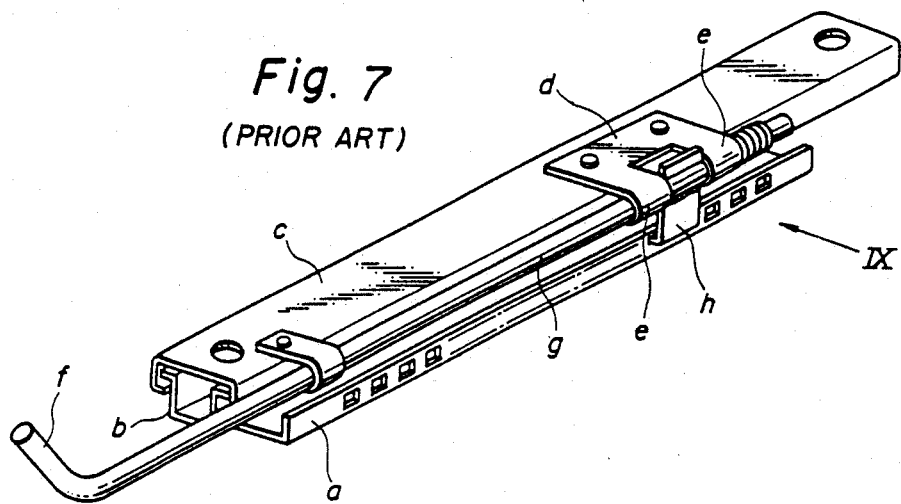
FIG. 7 is a perspective view of a conventional seat slider assembly.
Figure 8:
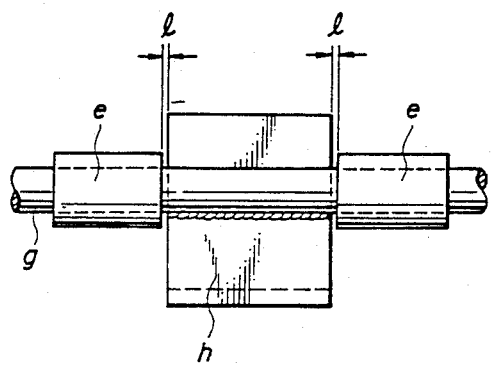
FIG. 8 is a side elevation of the seat slider assembly as viewed in a direction of arrow IX of FIG. 7.

In the seat slider assembly having the slide rail 10 as described above, when the shaft portion 50a of the operating lever 50 is rotated by operating the handle 50b of the operating lever 50, against the action of the biasing spring 51, from the position shown by a solid line in FIG. 4, where the projections 60a of the latch member 60 are engaged with the engaging holes 21a, 21a latch member 60 is rotated from the position of FIG. 1 to release the projections 60a from the engaging holes 21a, 21a . . .

When the projections 60a are released from the engaging holes 21a, 21a . . . , the seat-rail member 30 is allowed to slide, in the longitudinal direction of the vehicle, relative to the vehicle body-rail member 20. Thus, the seat S may be moved to a desired position. When the seat S is moved to the desired position, the shaft portion 50a is rotated by operating the handle 50b of the operating lever 50 to the position shown by the solid line in FIG. 4 to return the latch member 60 to the original state. The projections 60a are then re-engaged with the engaging holes 21a, 21a . . . Thus, the seat S is fixed at the desired position.

FIG. 6 illustrates still another embodiment in which an end of the latch member 60 is pressed against the inner end face 41a of the curled bearing portion 41 and the ring 70 is pressed against the outer end face 41b of the curled bearing portion 41 as in the forgoing embodiments. According to the present embodiment, however, a set pin 72 is inserted into a through-hole in the shaft portion 50a of the operating lever 50 to fix the ring 70 so as not to move in the axial direction.

The set pin 72 is tapered and the position of the ring 70 in the longitudinal direction of the shaft portion 50a may be varied by adjusting the insertion depth of the set pin 72 through the shaft portion 50a. The rig 70 is pressed against the outer end face 41b of the curled bearing portion 41. The set pin 72 is bent at a tip end thereof for fixing after it has been inserted through the shaft portion 50a.

Alternatively, the set pin 72 may be formed straight, instead of being tapered. In this case, the ring 70 is formed, for example, of a resilient member contractile in the longitudinal direction of the shaft portion 50a.

The present invention is not limited to the embodiments as described above. For example, the ring 70 is used as an abutment member in the foregoing embodiments, but any suitable abutment member (e.g. a member such as the bracket 52), which is abuttable against the confronting outer end face of the corresponding curled portion 41 or 42, may alternatively be provided on the shaft portion 50a of the operating lever 50. In this case, the abutment member is pressed against said outer end face of the curled bearing portion, while keeping one end of the latch member 60 pressed against the confronting inner end face of the curled portion 41 or 42.

Although the outer end face of the curled bearing portion is used for the abutment by the ring 70 in the foregoing embodiments, any other suitable member (not shown) fixed to the seat-rail member 30 may be used for the same purpose.

According to the seat slider assembly of the present invention, one end of the latch member disposed between the two curled bearing portions of the bracket, which is fixed to the seat-rail member, is kept to be pressed against the confronting inner end faces of the curled bearing portion. For example, an abutment member mounted on the shaft portion of the operating lever is pressed against the confronting outer end face of the corresponding curled bearing portion or the member fixed to the seat-rail member. Therefore, the latch member and the shaft portion of the operating lever are locked in the longitudinal direction of the rail member.

This will eliminate shaking of the latch member in the longitudinal direction and rattling at a time of starting or stopping of the vehicle. Therefore, strict dimensional control is not needed for gaps between the opposite ends of the latch member and the respectively confronting inner end faces of the curled bearing portions of the bracket. Thus, the manufacturing cost can be reduced.

We claim:

1. A seat slider assembly for supporting a seat on a vehicle so as to be adjustable in its position in a forward or rearward direction of the seat, which includes a rail member to be fixed to a vehicle body and provided with an engaging portion, a rail member to be fixed to the seat, the latter rail member being mounted on the former rail member movably in the longitudinal direction of the rail member, a bracket fixed to said rail member to be fixed to the seat and provided with two curled bearing portions, an operating lever whose shaft portion extends substantially along the lengths of the rail members is rotatably supported by the two curled bearing portions of the bracket and a latch member fixed to said shaft portion of the operating lever and selectively engageable with said engaging portion, said latch member having a length extending along the length of the shaft portion of the operating lever which is shorter than the distance between said two curled bearing portions of the bracket and fitted between the two curled bearing portions; which assembly comprises:

means acting on said shaft portion of the operating lever for holding said latch member in a position where the latch member is biased to contact either one of inner end faces of the curled bearing portions of the bracket, allowing a gap to be left between the latch and the other inner end face of the curled bearing portions of the bracket;

said means including an abutment member slidably received on said shaft portion of the operating lever to press against one of the outer end faces of the curled bearing portions and means for fixing said abutment member relative to the length of the shaft portion of the operating lever in said position;

said means for fixing said abutment member relative to the shaft portion of the operating lever having a contour which progressively and automatically biases said shaft portion of the operating lever relative to said abutment member when said lastmentioned means is being set into the assembly.

2. A seat slider assembly as claimed in claim 1, wherein said abutment member slidably is a ring member mounted around the shaft portion of the operating lever and said means for fixing said abutment member is raised portions formed on the shaft portion by nipping.

3. A seat slider assembly as claimed in claim 1, wherein said abutment member is a ring member mounted around the shaft portion of the operating lever and said means for fixing said abutment member is a set pin inserted through the shaft portion of the operating lever.

4. A seat slider assembly as claimed in claim 1 in which either one of the curled bearing portions is locked between said latch member and said abutment member fixed by said means for fixing said abutment member.

* * * * *